June 30, 1959 R. J. WHITE 2,892,432
METHOD OF PRODUCING COATED CONTAINERS
Filed Sept. 7, 1956 2 Sheets-Sheet 1
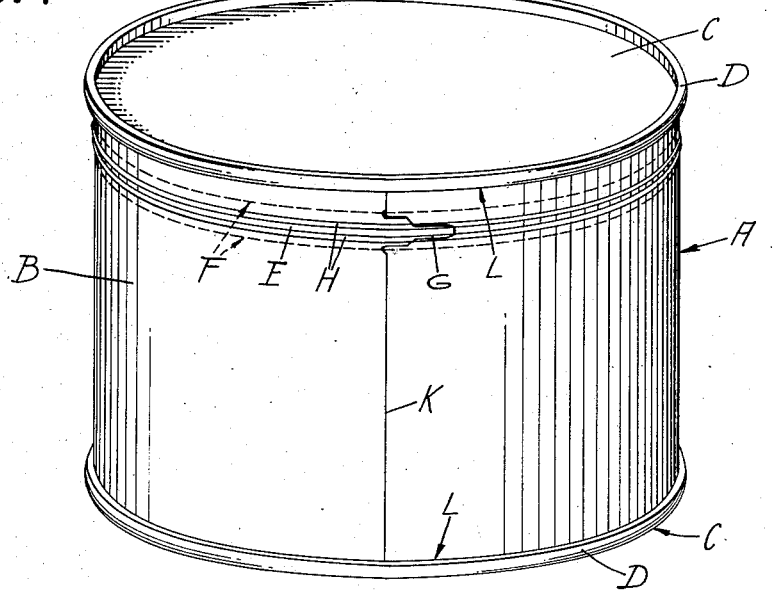
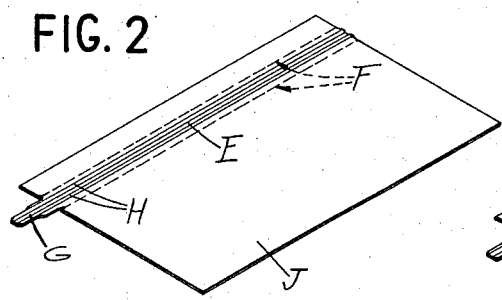
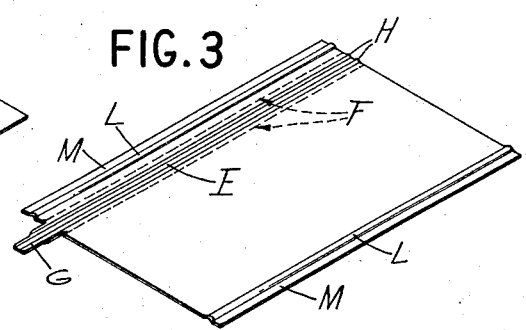
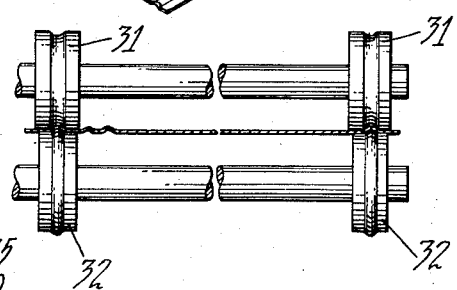
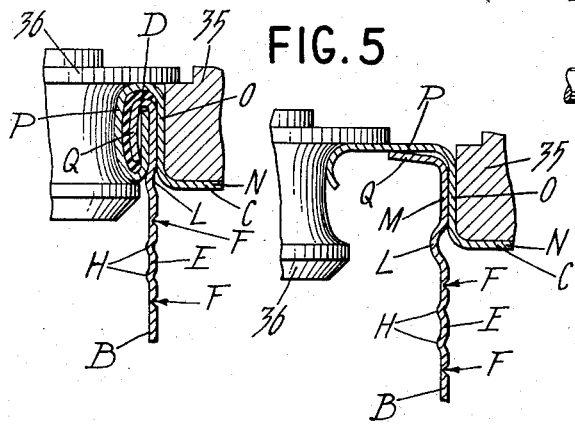
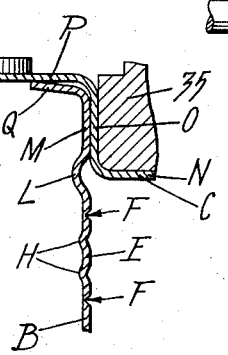
INVENTOR.
RICHARD J. WHITE
BY Charles H. Erne
Leland R. McCann
George W. Reiber
ATTORNEYS

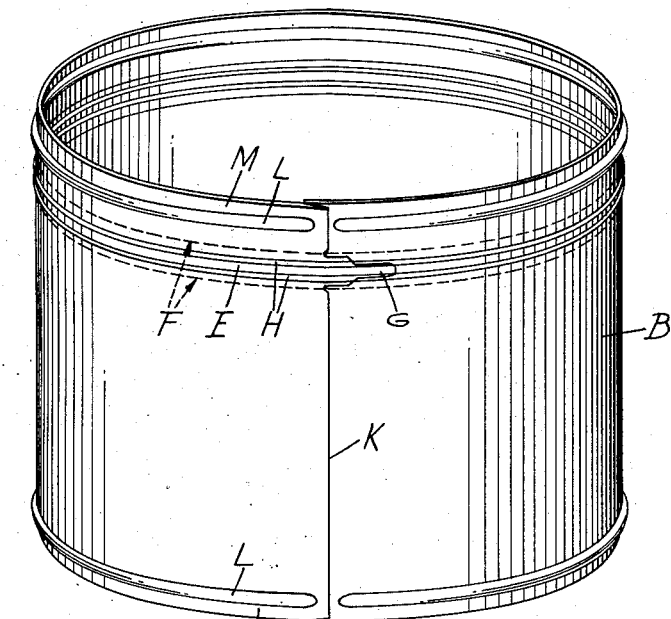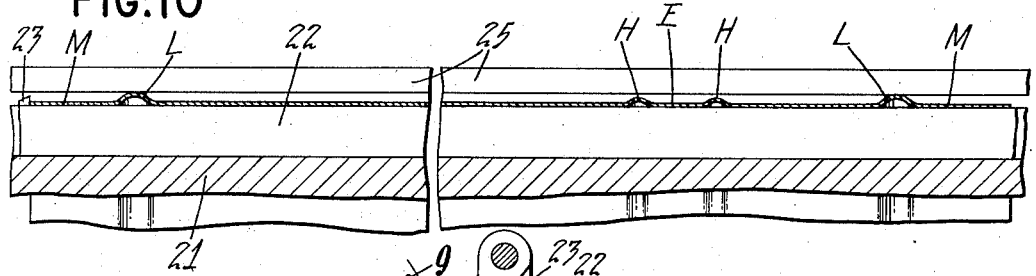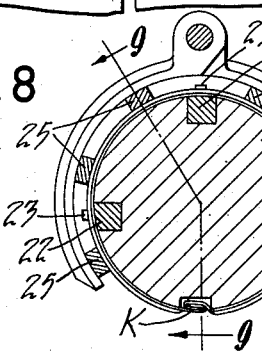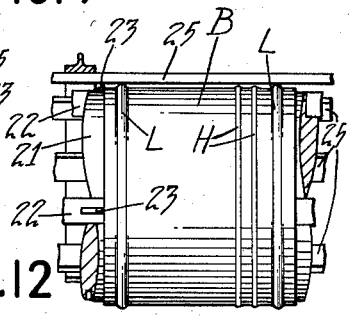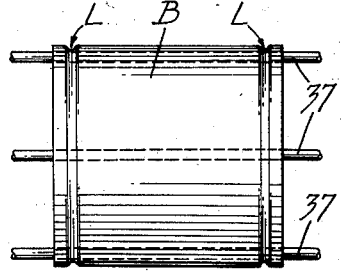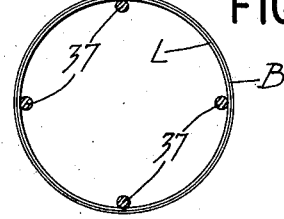

# United States Patent Office 2,892,432
Patented June 30, 1959

2,892,432
METHOD OF PRODUCING COATED CONTAINERS

Richard J. White, New York, N.Y., assignor to American Can Company, New York, N.Y., a corporation of New Jersey Application September 7, 1956, Serial No. 608,494

3 Claims. (Cl. 113—120)

The present invention relates to sheet metal cans or containers having bodies partially or entirely lithographed or otherwise coated exteriorly or interiorly and to a method of producing the same and has particular reference to body surface protecting beads which are located for subsequent concealment and protection when the closure members are attached to the bodies.

In commercial high speed production of sheet metal cans or containers, rectangular blanks are formed into tubular shape around a mandrel or horn of a can body making machine and are advanced along the horn through various stations at which the side seam edge portions are edged and hooked or otherwise prepared for uniting into a side seam which is soldered or otherwise sealed to render it hermetic to produce finished can bodies ready to receive their end closure members. During this travel through the can body making machine, the partially formed can bodies are guided and held against the horn in proper position by hold-down bars and the like for the various operations performed upon them. Where the blanks from which the bodies are made are pre-lithographed on the outside or pre-coated on the inside, the coated surface of the blank and the can body made therefrom often is considerably scratched or otherwise marred by contact with the machine parts during the passage of the blank and the body through the machine.

The instant invention contemplates overcoming this difficulty by the provision of a pair of integral supporting or protecting beads which surround the can body and are disposed to contact the machine parts and thus bear the abrasive action during the travel of the body through the machine, the beads being provided in the closure marginal edge portions of the body so as to be concealed in the end seams when the closure members are ultimately attached to the bodies.

An object of the instant invention is to protect against marring during manufacture of can bodies, those coated surfaces of the bodies or any protuberances thereon which are to be exposed to view in the finished containers to thereby enhance the appearance of the bodies and to insure the full protective qualities of the coating.

Another object is to provide supporting beads or other protuberances in the bodies to hold the adjacent coated surfaces of the bodies from contact with machine parts to protect the adjacent surfaces from damage.

Another object is to conceal the supporting beads in the end seams of the finished containers so as to enhance the outer appearance of the finished containers.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a sealed container produced in accordance with the method steps of the instant invention;

Figs. 2 and 3 are reduced scale perspective views of a blank from which the body of the container in Fig. 1 is produced, Fig. 2 showing the blank unbeaded and Fig. 3 showing the blank beaded;

Fig. 4 is a schematic view illustrating the step of beading the blank;

Figs. 5 and 6 are enlarged sectional views showing how the end closure members are secured to the container body;

Fig. 7 is an enlarged perspective view of the body of the container shown in Fig. 1;

Fig. 8 is a reduced scale end view of the container body of Fig. 7 in an outside guide section of a can body making machine, parts being shown in section;

Fig. 9 is a sectional view taken substantially along the line 9—9 in Fig. 8;

Fig. 10 is a fragmentary enlarged sectional view of the guide section of the bodymaker shown in Figs. 8 and 9;

Fig. 11 is a view similar to Fig. 9 showing the container body on an inside guide section of the can making machine; and Fig. 12 is an end view of the container body and inside guide section shown in Fig. 11.

As a preferred or exemplary embodiment of the instant invention the drawings illustrate a sheet metal can or container A (Fig. 1) made from tin plate, black iron or the like material in accordance with the instant improved method of producing the same. Such a container A preferably comprises a tubular body B having end closure members C attached thereto in suitable end seams, preferably conventional double seams D formed by the interfolding of flange portions on the closure members C and on the closure marginal edge portions of the body B. The bodies B preferably are lithographed on the outside and may or may not carry a protective coating on the inside.

The body B of the container A illustrated in the drawings preferably is provided with an encircling tearing strip E utilized in opening the container. This tearing strip E is defined by a pair of spaced and parallel score lines F which set off a removable area terminating in a tongue G for a conventional opening key. The tearing strip E preferably is provided with a pair of spaced and parallel outwardly projecting beads or protuberances H which extend the full length of the tearing strip for guiding and preserving the strip when it is removed.

In the manufacture of such containers A, the bodies B preferably are made from flat blanks J (Fig. 2) which are lithographed or otherwise coated as mentioned above and which contain the tearing strip E and the guide beads H. Such blanks J are fed into a can body making machine, for example the machine disclosed in United States Patent 1,770,041 issued July 8, 1930 to J. F. Peters on Roll Bodymaker, for conversion into can bodies. In such a machine a blank J is wrapped around a stationary horn or mandrel 21 (Figs. 8, 9 and 10) to bend the blank into a partially formed open-side tubular can body.

The can body in this form is advanced intermittently along the horn 21 in processional order by reciprocating feed bars 22 having spaced feed dogs 23 which engage behind the bodies in succession. The bars 22 are reciprocated in any suitable manner such as that disclosed in the above mentioned Peters' Patent 1,770,041. During this advancement of the partially formed can bodies they travel through various working stations at which the side seam marginal edge portions of the bodies are edged, formed into hooks, interlocked, and bumped tightly together in the usual manner to form a permanent side seam K which holds the body together. With the side seam thus formed it is fluxed and soldered to render it hermetic.

During the travel of a partially formed can body along the horn 21 for the various operations performed upon it, it is held in place against the horn by stationary hold-down bars 25 (Figs. 8, 9 and 10) usually equipped with spring pressed shoes which press against the can body and frictionally ride on it as the body advances under the shoes. There are a plurality of hold-down bars 25 disposed at points surrounding the upper half of the horn.

Where the outside surface of the partially formed can body is lithographed or otherwise coated and where the can body contains coated protuberances such as the tearing strip guide beads H, the rubbing of these surfaces and protuberances on the hold-down bars 25 quite frequently scratches or wears off the coating and thus leaves these surfaces or protuberances with a marred appearance which is undesirable in quality can making practice.

To overcome this difficulty, the can body blank J is provided with a pair of spaced and parallel support beads L (Fig. 3) which extend longitudinally of the blank, parallel with the tearing strip E, for a major portion of the length of the blank so that they will encircle the can body when it is formed into tubular shape. These support beads L project outwardly beyond the coated surface of the blank and beyond any protuberances on the blank such as the tearing strip guide beads H so that the support beads are engaged by and ride on the hold-down bars 25. The support beads L thus keep the hold-down bars 25 away from the coated surface of the can body and the protuberances H and thus protect them against marring.

The support beads L are formed in the blank J in any suitable manner, such as by passage of the blank between cooperating pairs of bead forming rollers 31, 32 (Fig. 4). This bead forming operation may be effected in a separate machine prior to the entrance of the blank into the can bodymaker or may be effected in the bodymaker prior to forming the blank into body shape or simultaneously with the forming of the blank into body shape as at the roll form station of the machine.

The support beads L in riding on the hold-down bars 25, in themselves become marred and in order to offset this condition to preserve the quality appearance of the finished container, provision is made to conceal the marred support beads L in the end seams D of the finished container. For this purpose the support beads L in the blank J are located in the closure marginal edge portions M (Fig. 3) of the blank and are spaced inwardly a predetermined distance from the edges of the blank so as to be incorporated in the end seams D.

Hence when the closure members C are applied to the open ends of the finished can bodies B as shown in Fig. 1 the marred support beads L are disposed in the region immediately adjacent the closure members. By way of example, the drawings show these closure members C as having a countersunk panel N (Fig. 5) surrounded by a substantially vertical wall O which frictionally fits within the open end of the can body B. The upper edge of the wall O merges into an outwardly extending curled flange P which overlies an outward flange Q on the can body surrounding its open end.

When the closure members C are secured in place on the can body in the conventional manner, as by an interfolding of the closure flange P with the body flange Q to produce the uniting double seams D, the adjacent support beads L are incorporated in the seams and are ironed out into a substantially flat condition such as shown in Fig. 6. This forming of the seams D is effected in any suitable manner, such as by the use of the conventional chuck 35 and seaming roller 36 which form parts of conventional can closing or seaming machines.

In this method of producing containers, the marred support beads L are concealed in the end seams D of the containers where the marred surfaces of the beads are covered and thereby protected against corrosion and are concealed from view. This enhances the appearance of the finished containers. Preferably the beads L are located in the blank J so as to assume a final position immediately adjacent the lower edge of the seam D as shown in Figs. 1 and 6.

In the same manner, the support beads L may be struck inwardly beyond the coated inside surface of a can body or any protuberances thereon as shown in Figs. 11 and 12 so as to protect the inner coated surface of the can body during its manufacture as it travels along inside support rails 37 of inside horns or mandrels frequently used in soldering machines and the like.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. The method of producing containers having coated bodies, comprising peripherally beading the opposite marginal portions of a container body blank to be incorporated in end seams to provide substantially continuous peripheral support beads on opposite ends of the body, advancing the coated and beaded body along a fixed support for container making operations thereon to form a tubular body while frictionally holding the body against said support so that the coating on the body is held by said support beads out of frictional contact with said support and frictional holding means to protect the coating against marring thereby, and finally securing at least one closure member to an end of said tubular body in an end seam including at least one of said support beads while ironing out the bead to conceal from view the frictionally marred surface thereof.

2. The method of claim 1 wherein said container body is cylindrical and said support beads are projected circumferentially outwardly of said body to protect and leave unmarred a lithographed design coating on the exterior surface thereof.

3. The method of claim 1 wherein said container body is cylindrical and said support beads are projected circumferentially inwardly of said body to protect and leave unmarred a lithographed design coating on the interior surface thereof.

References Cited in the file of this patent

UNITED STATES PATENTS

| | | |
|---|---|---|
| 1,770,041 | Peters | July 8, 1930 |
| 2,235,377 | Laxo | Mar. 18, 1941 |
| 2,326,815 | Wobbe | Aug. 17, 1943 |
| 2,379,898 | Geertsen | July 10, 1945 |
| 2,521,098 | Sebell | Sept. 5, 1950 |
| 2,643,627 | Wobbe | June 30, 1953 |
| 2,701,000 | Colvin | Feb. 1, 1955 |